United States Patent
Venkatram et al.

(10) Patent No.: US 6,367,010 B1
(45) Date of Patent: Apr. 2, 2002

(54) METHOD FOR GENERATING SECURE SYMMETRIC ENCRYPTION AND DECRYPTION

(75) Inventors: Rajamadam C. Venkatram, San Jose; Ravi Viswanath, Sunnyvale; Unmesh Sahasrabuddhe, Palo Alto; Ashish Warty, San Jose; Rahul Khandkar, Palo Alto, all of CA (US)

(73) Assignee: PostX Corporation, Cupertino, CA (US)

( * ) Notice: Subject to any disclaimer, the term of this patent is extended or adjusted under 35 U.S.C. 154(b) by 0 days.

(21) Appl. No.: 09/347,621

(22) Filed: Jul. 2, 1999

(51) Int. Cl.[7] .............................. H04L 9/08; H04L 9/12
(52) U.S. Cl. ...................... 713/171; 713/165; 380/262
(58) Field of Search .................... 713/164, 165, 713/170, 171, 182, 202; 380/262, 281

(56) References Cited

U.S. PATENT DOCUMENTS

| | | | |
|---|---|---|---|
| 5,150,407 A | 9/1992 | Chan | 380/4 |
| 5,153,919 A | 10/1992 | Reeds, III et al. | 380/44 |
| 5,214,698 A | 5/1993 | Smith, Sr. et al. | 380/21 |
| 5,416,840 A | 5/1995 | Cane et al. | 380/4 |
| 5,485,519 A * | 1/1996 | Weiss | 380/23 |
| 5,588,056 A | 12/1996 | Ganesan | 380/4 |
| 5,619,571 A | 4/1997 | Sandstrom et al. | 380/4 |
| 5,623,546 A | 4/1997 | Hardy et al. | 380/4 |
| 5,657,390 A * | 8/1997 | Elgamal et al. | 380/49 |
| 5,677,952 A | 10/1997 | Blakley, III et al. | 380/4 |
| 5,684,951 A | 11/1997 | Goldman et al. | 395/188.01 |
| 5,694,471 A | 12/1997 | Chen et al. | 380/25 |
| 5,721,780 A | 2/1998 | Ensor et al. | 380/25 |
| 5,764,766 A | 6/1998 | Spratte | 380/21 |
| 5,768,373 A | 6/1998 | Lohstroh et al. | 380/4 |
| 5,771,291 A | 6/1998 | Newton et al. | 380/25 |
| 5,787,169 A * | 7/1998 | Eldridge et al. | 380/4 |
| 5,796,830 A * | 8/1998 | Johnson et al. | 380/21 |
| 5,870,473 A * | 2/1999 | Boesch et al. | 380/21 |
| 5,907,618 A * | 5/1999 | Gennaro et al. | 380/21 |

FOREIGN PATENT DOCUMENTS

| | | | | |
|---|---|---|---|---|
| DE | 196 39 354 A | 1/1998 | | H04L/9/00 |
| EP | 0 334 503 A | 9/1989 | | H04L/9/00 |
| JP | 3-239032 | * 10/1991 | | H04K/1/00 |
| WO | WO 98 34374 A | 8/1998 | | H04L/9/32 |

OTHER PUBLICATIONS

B. Schneier, "Applied Cryptography, Second Edition: Protocols, Algorithms, and Source Code in C," Oct. 18, 1995, pp. 170–175.*

Translation into English, Hoshino et al., Japanese Patent No. 3–239032, Oct. 24, 1991.*

* cited by examiner

*Primary Examiner*—Gail Hayes
*Assistant Examiner*—Jurtin T. Darrow
(74) *Attorney, Agent, or Firm*—Pillsbury Winthrop LLP

(57) ABSTRACT

The present invention relates to a method for generating secure symmetric encryption/decryption via the Internet. The present method provides for a more advanced and sophisticated manner of preventing hackers from accessing sensitive and private information. Information is encrypted and decrypted using unique keys in combination with the recipient's PIN numbers. Each unique key corresponds to one recipient and is locally stored on the recipient's computer device. Thus, in order to decrypt information using the present invention, the recipient is required to provide the correct password while using the computer device that includes the unique key.

19 Claims, 6 Drawing Sheets

METHOD FOR GENERATING SECURE SYMMETRIC ENCRYPTION AND DECRYPTION

FIELD OF THE INVENTION

The present invention relates to the field of security and privacy on the Internet, and more particularly, to a method for generating secure symmetric encryption/decryption. The present invention encrypts the electronic document/message with a unique key in combination with a recipient's password. The electronic document/message is likewise decrypted using the unique key, which is store on the recipient's computer device, in combination with the recipient's password.

BACKGROUND OF THE INVENTION

Recently, the technological advances associated with the electronic data exchange, Internet, World Wide Web (WWW), and electronic commerce are providing many people an alternative to the traditional method of communicating and conducting business. For example, many people are now using the Internet as a preferred method for sending mail, documents and messages, purchasing goods and services, trading stocks, applying for loans and credit cards, and the like. As a result, sensitive and private information is constantly being transmitted over the Internet in exorbitant numbers.

As is well known, most data and information transmitted over the Internet are unsecured. Thus, in most instances, access to sensitive and private information on the Internet can only be accessed when the user provides the appropriate user identification (id) number and/or the corresponding personal id number (PIN) or password. This is also true when the user first logs on to his/her personal computer, portable digital assistant (PDA), and the like in order to access/run files, documents, programs, applications, etc.

As technology becomes more advanced and sophisticated, unauthorized people or "hackers" are developing techniques for accessing sensitive and private information that should be secure and private. Also, as more people use the Internet for various reasons, more and more sensitive and private information is transmitted over the Internet.

Fortunately, software engineers have developed ways to transmit sensitive and private information over the Internet in a secure manner. The sender encrypts the information, that is, alters the information so that it will look like meaningless garble of data to anyone other than the intended recipient. This information is then decrypted by the recipient so that the information is turned back into its original form. The general concept behind the traditional encryption-decryption method is that when a sender encrypts the message with a key, then only someone else with a matching key will be able to decrypt the message. Thus, it is important to use keys that provide the ability to have greater security. Accordingly, the present invention is directed to a method for providing a more advanced and sophisticated manner of preventing hackers from accessing sensitive and private information.

SUMMARY OF THE INVENTION

It is an object of the present invention to provide a method for generating secure symmetric encryption/decryption.

It is another object of the present invention to provide a secure method for transmitting sensitive and private information via the Internet.

It is yet another object of the present invention to provide a secure method for transmitting sensitive and private information in a cost efficient and timely manner via the Internet.

It is a further object of the present invention to provide a method for encrypting and decrypting information using unique keys in combination with the recipient's PIN numbers.

It is another object of the present invention to provide a method for encrypting and decrypting information using a unique key having a least 256 bits.

It is yet another object of the present invention to provide a method for encrypting and decrypting keys that are used to encrypt and decrypt the sensitive and private information.

These and other objects of the present invention are obtained by providing a method for generating secure symmetric encryption/decryption. The encryption process uses a unique key in combination with a recipient's password for encrypting information that is to be transmitted to the recipient. The decryption process likewise uses the unique key, which is stored on the recipient's computer device, in combination with the recipient's password to decrypt the information. The unique key according to the present invention includes, preferably, at least 256 bits. In addition, the present invention encrypts both the document/message and a session salt key to provide greater security.

BRIEF DESCRIPTION OF THE DRAWINGS

These and other objects and advantages of the present invention will become apparent and more readily appreciated from the following detailed description of the presently preferred exemplary embodiment of the invention taken in conjunction with the accompanying drawings, of which.

DETAILED DESCRIPTION OF THE PREFERRED EMBODIMENTS

Figure 1:
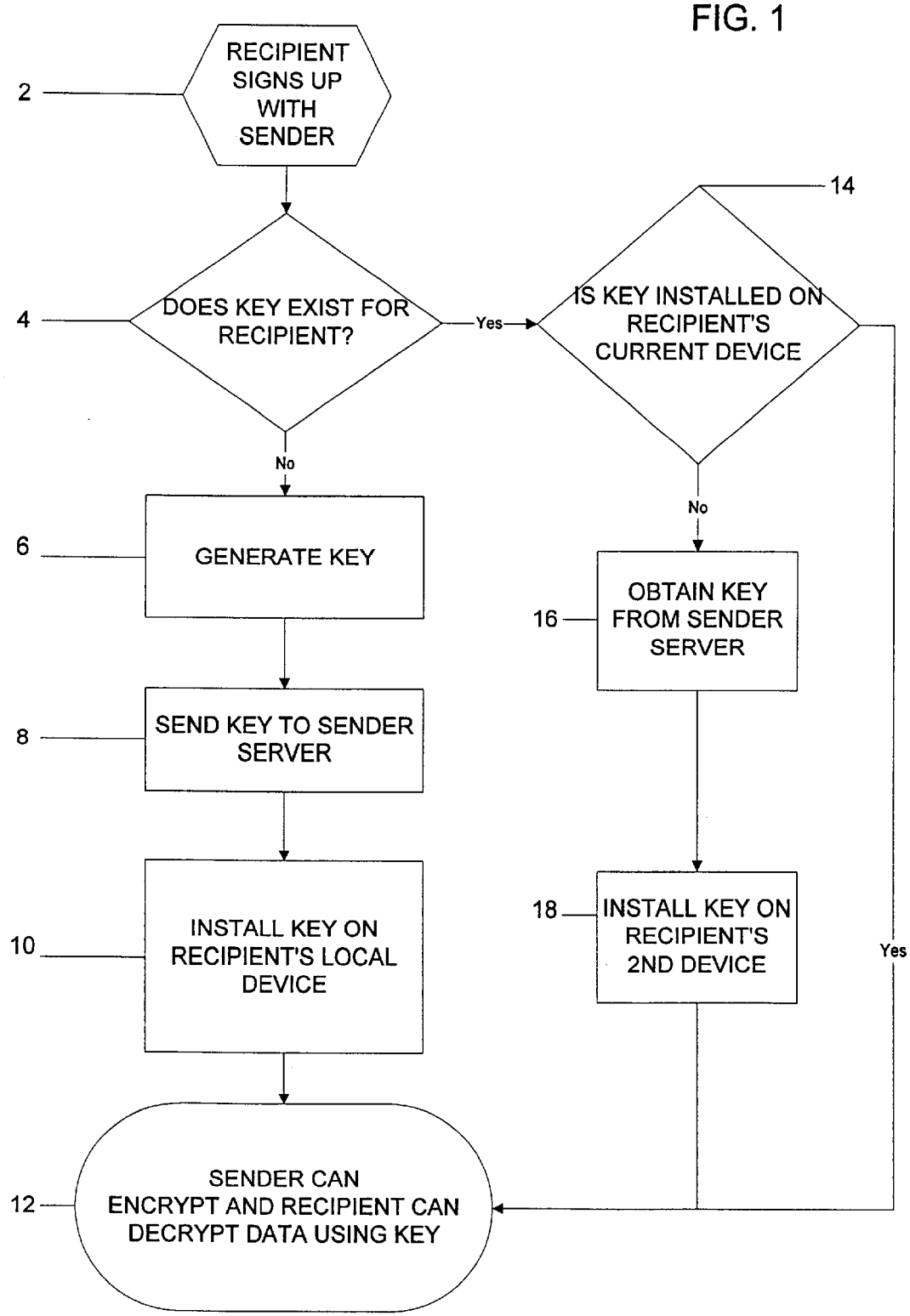
FIG. 1 illustrates a flow chart of a method for installing a unique key on a computer device in accordance with the present invention.

The preferred embodiment of the present invention will now be described with reference to FIGS. 1–5, wherein like components are designated by like reference numerals throughout the various figures. The present invention is directed to a method for generating secure symmetric encryption/decryption. One skilled in the art will appreciate that various substitutions and modifications can be made to the examples described herein while remaining within the spirit and scope of the present invention.

The present invention provides a method for encrypting/decrypting sensitive and private information that is transmitted over the Internet. Although the Internet will be used as the preferred media for transmitting information, other networks such as a private network, Intranet, LAN, MAN, WAN, or the like may be used in accordance with the present invention.

The encryption process of the present invention uses a "unique key" and a user-PIN to encrypt the data transmitted to a recipient. This encryption process is known to be more secure than the symmetric encryption process currently used because hackers will have a very difficult time cracking the decryption key using the dictionary attack. Likewise, the decryption process of the present invention uses the unique key and user-PIN to decrypt the same data. The unique key resides on the recipient's computer device for such decryption.

In more detail, the unique key according to the present invention consists of two parts, a unique identifier having at least 256-bits (hereinafter called "key-PIN") and a unique salt (described in more detail later herein) having at least 256-bits (hereinafter called "key-Salt" ). Both the key-PIN and key-Salt are generated using a secure algorithm, such as RSA's MD5 secure random algorithm or other algorithms during the user's first subscription process. The key-PIN in combination with the user-PIN provides a password that is used to generate the unique encryption key of the present invention. The user-PIN is the portion that the user must input (memorize/remember) into the system while the key-PIN is the portion that is stored on the user's computer device.

FIG. 1 illustrates a flow chart of a method for installing a unique key on a user/recipient computer device in accordance with the present invention. In order to implement the present invention between two users, at least one user must have the capability to generate the unique key and both users must be capable of locally storing the unique key. FIG. 1 assumes that a recipient will need to install the unique key on the recipient's computer device while a sender will be able to generate the unique key and also stored it locally. In describing the present invention, the sender is assumed to be a service/goods provider on a communication exchange, such as the Internet. The recipient can use a computer, PDA, or the like that is capable of receiving and transmitting data.

The recipient first signs up at a sender's web-site for a secure session and initiates subscription/setup in step 2. The recipient may sign up using a conventional web browser such as the Internet Explorer 4.0/5.0 (believed to be a registered Trademark of Microsoft Corp.) or Netscape Navigator (believed to be a registered Trademark of Netscape, Inc.). A user-PIN is then assigned (either through the recipient providing the user-PIN or the sender assigning one) to the recipient/user. Preferably, the user-PIN should have a minimum number of characters (recommended minimum is between 4 to 20 characters) that will allow the recipient to easily memorize and remember the user-PIN.

After the recipient has signed up in step 2, the sender server is searched to determine whether a unique key has been previously created for the particular recipient in step 4. If the unique key has not been previously created for the particular recipient, then the unique key is generated in step 6. The process of generating the unique key for the recipient is described in more detail later herein. Once the unique key is generated for the recipient, it is sent to the sender server for storage and future use in step 8. Furthermore, the unique key is likewise sent to the recipient so that it can be installed on the recipient's local computer device in step 10. Thereafter, the sender and the recipient can encrypt and decrypt the documents/messages using the unique key in step 12. It is important to note that each recipient has only one unique key, but may obtain other unique keys if the recipient registers with a different name and user-PIN.

Referring back to step 4, a unique key may already exist on the sender server for the particular recipient. The unique key will exist on the sender server if steps 6, 8, and 10 have been previously performed for the recipient. Once it is determined that the unique key exists for the recipient, the next step is to determine which computer device the recipient is using in step 14. For instance, if the recipient is using a computer device that has previously installed the unique key, then the sender and recipient can encrypt and decrypt documents/messages using the unique key in step 12. If, however, the recipient is using a computer device other than the one with the unique key installed, then the unique key is retrieved from the sender server and sent to the recipient in step 16. Thereafter, the unique key is installed on the recipient's second computer device in step 18. Thus, steps 16 and 18 are performed if the recipient has already installed the unique key only on the recipient's first computer device and the recipient is now using a second computer device.

In other situations, the recipient may desire to obtain a second different key for various reasons. For example, the recipient may have forgot his user-PIN or the recipient may feel that someone other than himself/herself has access to his sensitive and private information. In this case, the recipient will sign up with the sender in step 2 and perform steps 4, 6, 8, and 10 to generate and install a second different key on the recipient's computer device.

As described above, one unique key is assigned to one particular recipient and stored on the recipient's computer device. Thus, using the present method, it is very difficult for a hacker to decrypt the recipient's sensitive and private information unless the hacker has access to both the recipient's computer device and corresponding user-PIN.

Figure 2A:
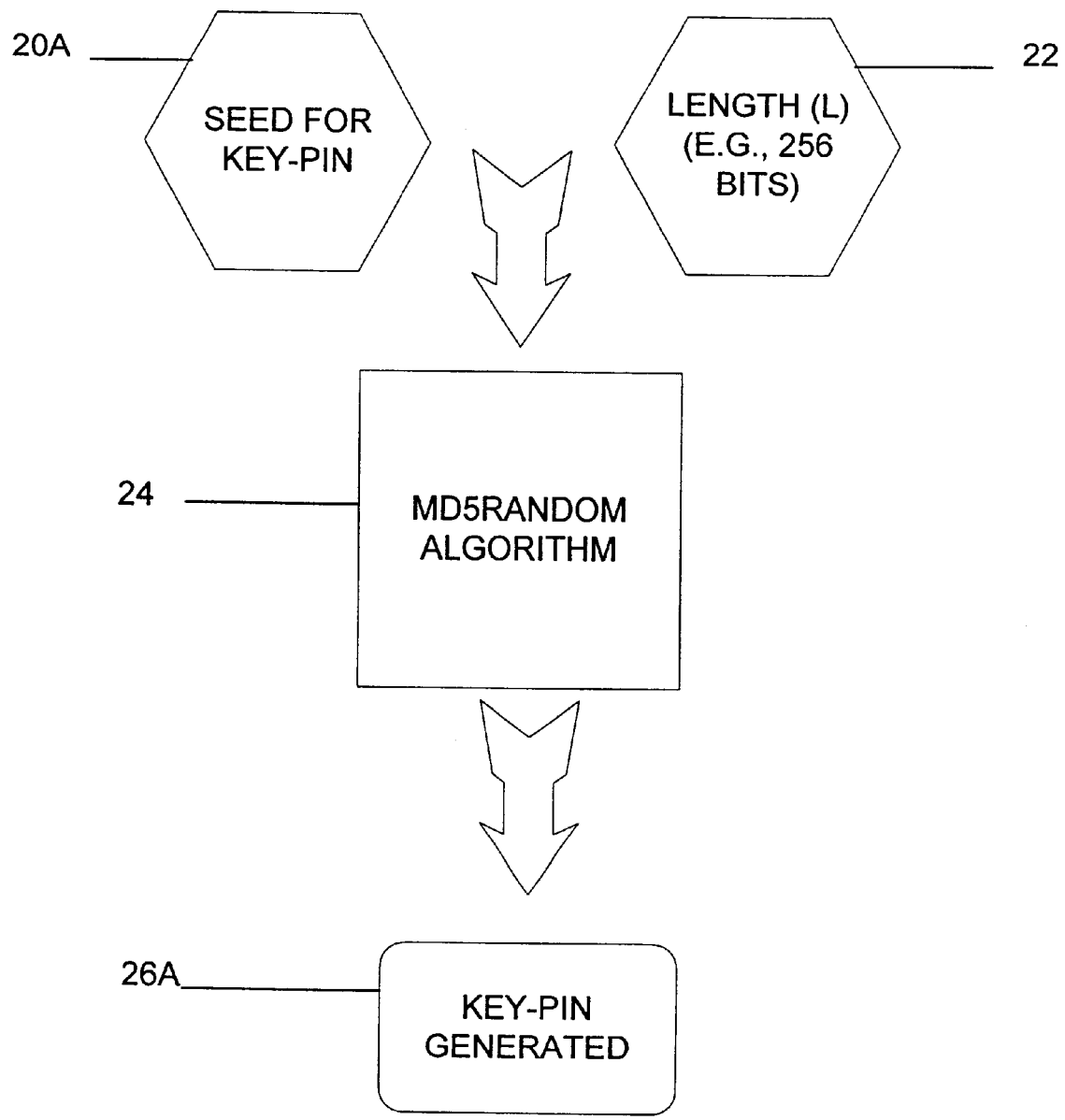
FIGS. 2A–2B illustrate diagrams of methods for generating a key-PIN and a key-Salt in accordance with the present invention.
Figure 2B:
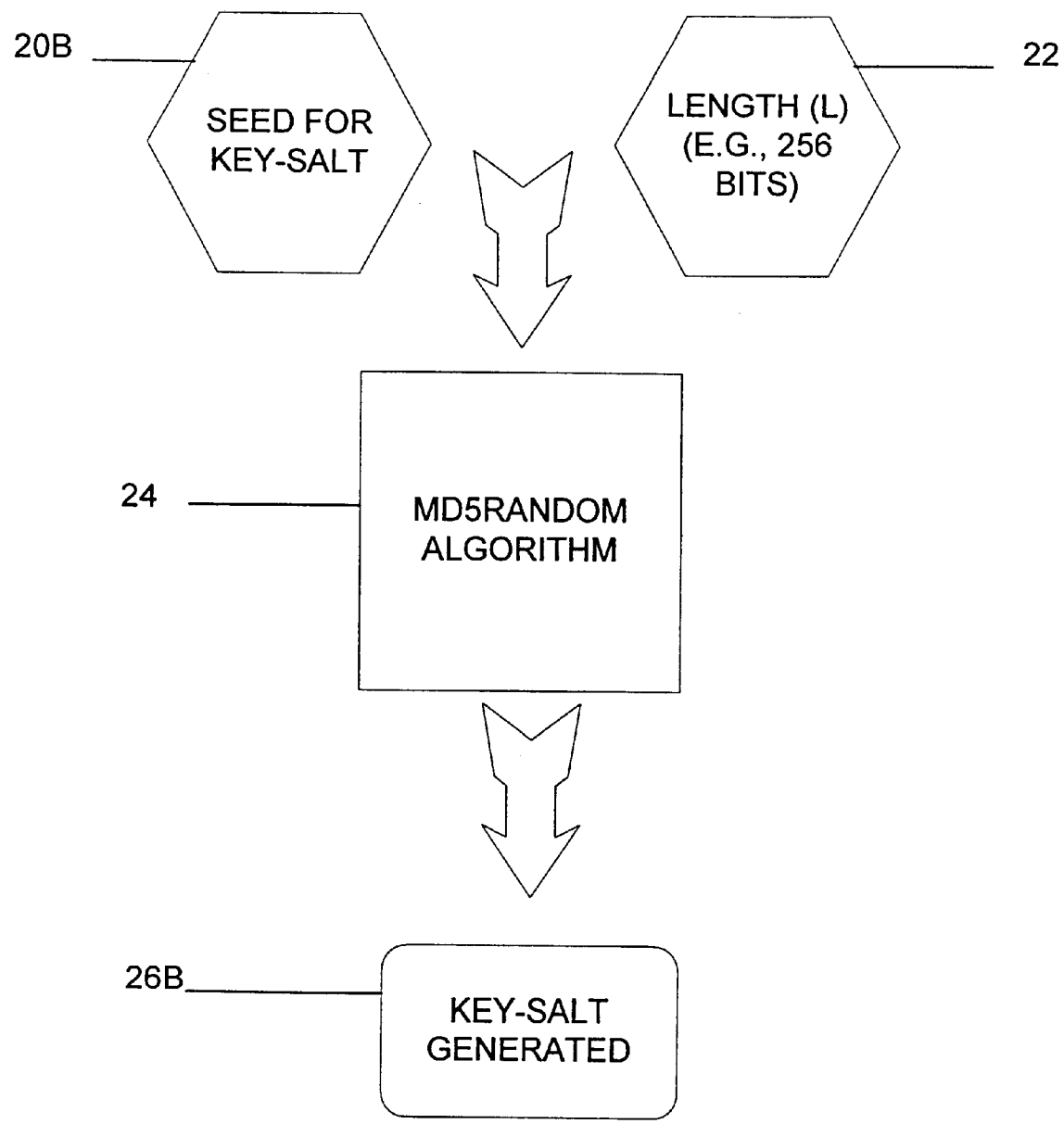

FIGS. 2A–2B illustrate diagrams of methods for generating (step 6 of FIG. 1) a key-PIN and key-Salt in accordance with the present invention. Before the unique key is generated, it is assumed that there exists a separate means of authenticating the recipient based on a prior relationship between the sender and the recipient. For example, a prior relationship exists when the recipient has previously logged into the sender's secure web site. Another assumption that is made is that there is a secure session (e.g., SSL) during which the plug-in and other security information is transferred between the sender web server and the recipient's computer device.

FIG. 2A illustrates a diagram showing the process of generating the key-PIN, and FIG. 2B illustrates a diagram showing the process of generating the key-Salt. The two processes are very similar except that different seeds, described further hereinafter, are used to generate the key-PIN and the key-Salt. In this context, a salt is a term used to represent a unique value, data, etc. that is specific to a document/message. For example, in an online stock trade context, a salt can be the exact date and time that the trade was conducted. Thus, each salt has a value that is unique for each particular document/message.

A seed 20a, 20b is used to generate either the key-PIN or key-Salt. Again, a different seed 20a, 20b is used to generate the key-PIN and the key-Salt, respectively. The seed 20a, 20b consists of recipient specific information such as the recipient's name, address, social security number, date of birth, mother's maiden name, etc. The seed 20a, 20b can also include data such as the specific time (in milliseconds) and date that the recipient signed up at the sender's web site. For example, a seed containing data such as the user's name and sign up time can be used as the seed 20a for generating the key-PIN, while data such as the user's social security number can be used for the seed 20b for generating the key-Salt. It is important to note that any other combinations of recipient's data can be used as the seeds to generate the key-PIN and key-Salt. The seed 20a, 20b and a length 22 having at least 256 bits are used by a security algorithm, such as RSA's MD5Random Algorithm 24 to generate the key-PIN 26a and the key-Salt 26a. While the RSA MD5Random Algorithm is preferred, other security algorithms such as SHA-1 may be used in the present invention. Thus, the key-PIN 26a and the key-Salt 26a are random numbers having at least 256-bits in length. Once the key-PIN and key-Salt are generated, they are sent to the sender server (step 8 of FIG. 1) and then installed on the recipient's computer device (step 10 or step 18 of FIG. 1).

Preferably, the unique key (key-PIN and key-Salt) is sent encrypted (using a 128-bit hard-coded key stored in the plug-in for obfuscation) to the recipient and downloaded at the recipient's local computer device along with the corresponding plug-in (signed user software). The encrypted unique key and the plug-in are then stored on the consumer's local device, and the encrypted unique key and the user-PIN are also stored in the sender's profile database.

Also, the plug-in may be Java based and is downloaded and installed on the customer's local computer device. Any known method of downloading and installing the plug-in may be used in accordance with the present invention. For some recipients, a plug-in may already be installed on the computer device. Preferably, the plug-in contains the encryption-decryption code.

Figure 3:
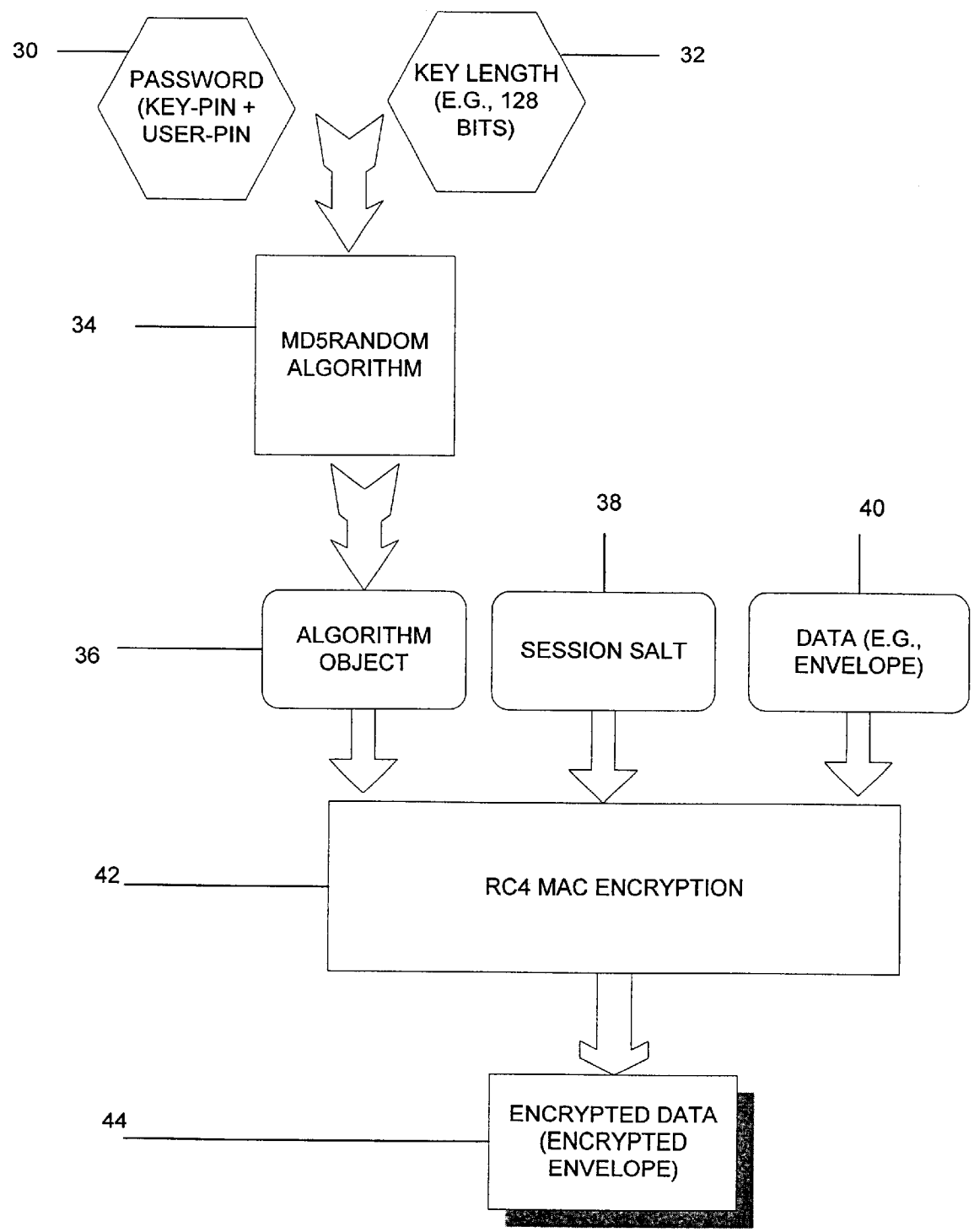
FIG. 3 illustrates a diagram of a method for encrypting an electronic envelope in accordance with the present invention.
Figure 4:
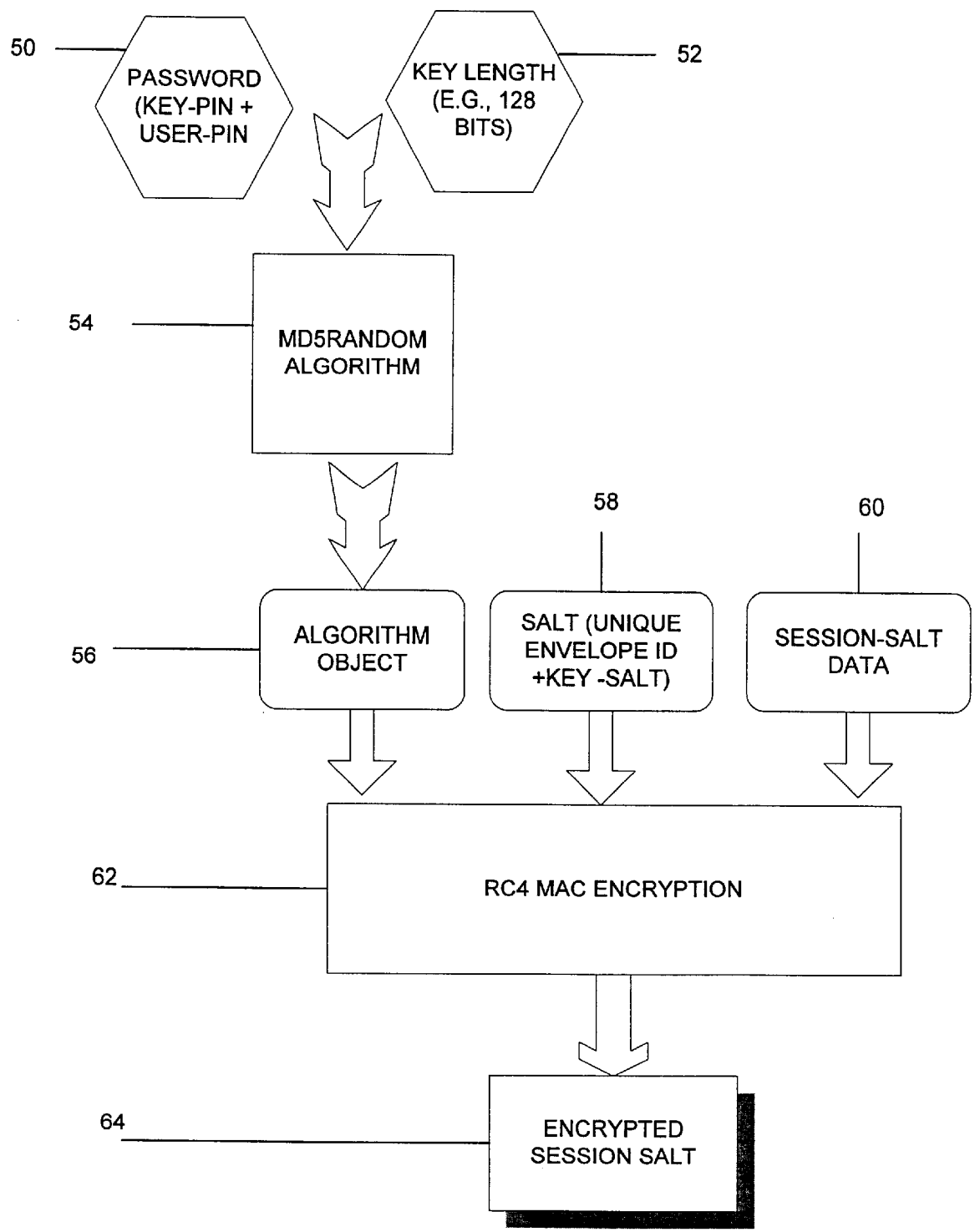
FIG. 4 illustrates a diagram of a method for encrypting a session salt in accordance with the present invention.

FIGS. 3 and 4 illustrate diagrams describing the methods for encrypting an envelope and the session salt using the key-PIN, key-Salt, user-PIN, and the Envelope id in accordance with the present invention. The present invention is used to encrypt both the actual data contained in the envelope (document, message, etc.) and the corresponding session salt key before they are transmitted to the recipient. Thus, the recipient needs to decrypt both the session salt key and the data for successful decryption of the envelope. In describing the encryption process of the present invention, it is assumed that an electronic envelope containing the sensitive and private data is encrypted and sent to the recipient. Other types of transmitting medium besides the electronic envelope may be used in the present invention. Such transmitting medium may include word processing and spreadsheet documents/files, bitmap files, GIF files, etc.

FIG. 3 illustrates a diagram for encrypting an electronic envelope. The present invention assumes that the encryption process requires at least three input sources. For instance, an algorithm object, a salt, and data are required in order to encrypt the package using an encryption process such as RC4 MAC encryption. Other encryption methods besides the RC4 MAC encryption process can be used with the present invention. It is important to note that the encryption is unique to the recipient and the envelope.

A password 30 that includes both a key-PIN and a user-PIN is combined with a length 32 having at least 128 bits and inputted into a security algorithm, such as MD5Random algorithm 34. After running the algorithm 34, an algorithm object 36 is generated which contains both the key-PIN and the user-PIN and inputted into, for example, a RC4 MAC encryption 42. Meanwhile, a session salt 38 specific to the data (envelope) 40 is likewise generated using, for example, the MD5Random algorithm (not shown) and inputted into the RC4 MAC encryption 42. As will be described in more detail later herein, the session salt will represent one-half of the entire key that is needed to decrypt the envelope. The envelope (data) 40 is also inputted into the RC4 MAC encryption 42. With these three inputs, algorithm object 36, session salt 38, and envelope 40, the RC4 MAC encryption 42 encrypts the envelope so that it can be securely transmitted to the recipient. Thus, an encrypted envelope 44 is generated using this process.

FIG. 4 illustrates a diagram of a method for encrypting a session salt in accordance with the present invention. As described above, the present invention is used to encrypt the session salt (one half of the key and session salt 38 of FIG. 3) along with the envelope to make the encryption/decryption process of the present invention more secure and complete.

Similar to the process described in FIG. 3, a password 50 (password 30 in FIG. 3) that includes both a key-PIN and a user-PIN is combined with a length 52 (length 32 in FIG. 3) having at least 128 bits and inputted into, for example, a MD5Random algorithm 54. After running the algorithm 54, an algorithm object 56 is generated which contains both the key-PIN and the user-PIN and inputted into, for example, a RC4 MAC encryption 62. A second salt 58 that includes both a unique envelope ID and the key-Salt that has been previously generated using the MD5Random algorithm (not shown) is also inputted into the RC4 MAC encryption 62. The unique envelope id is data that does not need to be encrypted/decrypted because it contains permanent information regarding the envelope. For example, the unique envelope id may contain information regarding the time the envelope was generated, type of project/job the envelope corresponds to, etc. The key-Salt is generated as described earlier with reference to FIG. 1. The session salt data 60 (from session salt 38 in FIG. 3) is also inputted into the RC4 MAC encryption 62. With these three inputs, algorithm object 56, second salt 58, and session salt data 60, the RC4 MAC encrypts the session salt.

Once the envelope and the session salt (part of a key) are encrypted, the unique envelope id, the encrypted envelope and the encrypted session salt are combined into one file and transmitted to the recipient. The encryption process is completed.

Figure 5:
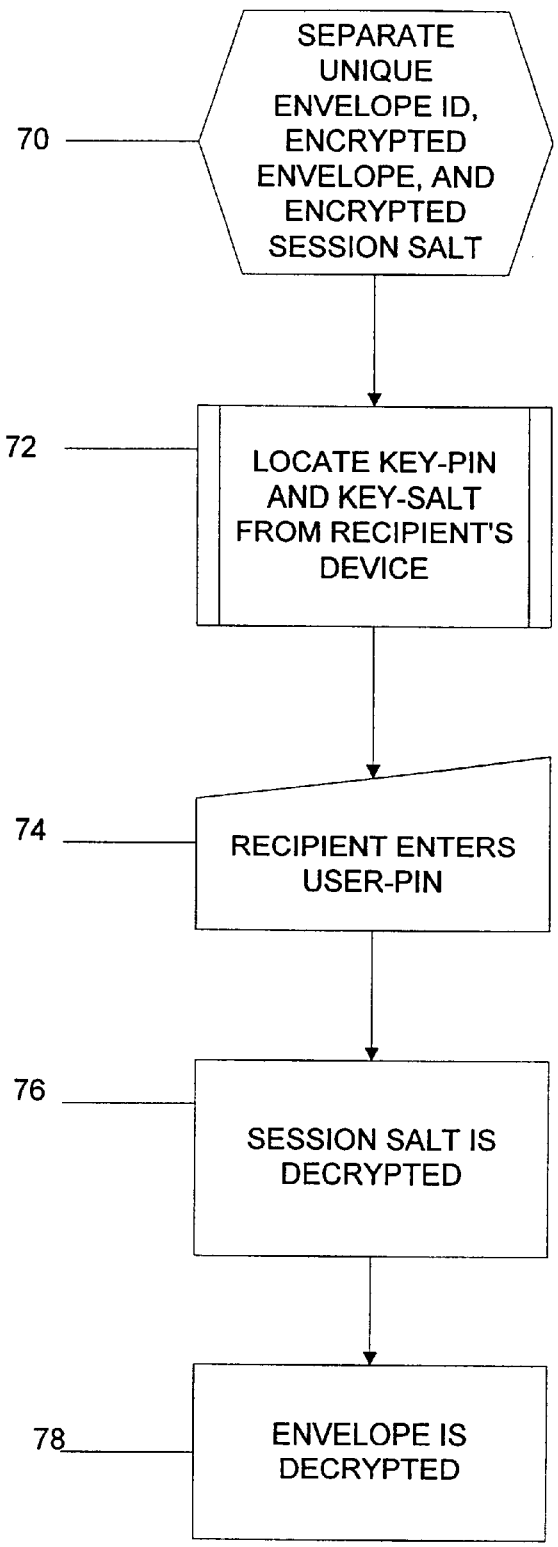
FIG. 5 illustrates a flow chart for decrypting an encrypted electronic envelope and encrypted session salt in accordance with the invention.

FIG. 5 illustrates a flow chart for decrypting the encrypted session salt and encrypted envelope in accordance with the invention. The envelope decryption process is done in essentially the reverse order of the encryption process. When the encryption information is received at the recipient's computer device, the unique envelope id, the encrypted envelope, and the encrypted session salt are separated out in step 70. Next, in step 72, the key-PIN and the key-Salt are located and retrieved from the recipient's device. The recipient then enters the user-PIN in step 74, which begins the decryption process. The user-PIN entered by the recipient in step 74 should be the same as the recipient's user-PIN stored in the sender's database. Entering the correct user-PIN begins the process of decrypting the electronic envelope.

The session salt is first decrypted in step 76 so that the envelope can be decrypted. With the decrypted session salt, user-PIN, and unique key, the envelope is decrypted in step 78. These added security measure provides assurance to the recipient that the electronic envelope and the data contained therein are secure and confidential until the recipient provides the correct password. Thus, when the user provides the correct user-PIN, this process calls up the longer unique key that is needed to decrypt the envelope. Because the present invention uses both the unique key and the recipient's password for encryption, this method is more secure than conventional encryption/decryption methods.

In the previous descriptions, numerous specific details are set forth, such as specific algorithms, encryption/decryption process, key lengths, data, processes, etc., to provide a thorough understanding of the present invention. However, as one having ordinary skill in the art would recognize, the present invention can be practiced without resorting to the details specifically set forth. For example, other secure algorithms may be substituted for the MD5Random Algorithm, and other encryption methods can be likewise be substituted for the RC4 MAC encryption.

Although various preferred embodiments of the present invention have been disclosed for illustrative purposes, those skilled in the art will appreciate that various modifications, additions and/or substitutions are possible without departing from the scope and spirit of the present invention as disclosed in the claims.

We claim:

1. A method for encrypting electronic data transmitted by a sender server to a recipient device, the method comprising the steps of:

generating a key for storing on the sender server;

transmitting a copy of the key to the recipient device, wherein the copy of the key is unique to and permanently installed on the recipient device;

encrypting electronic data from the sender server using the key; and transmitting the encrypted electronic data from the sender server to the recipient device.

2. A method according to claim 1, wherein the key comprises a key-PIN and a key-Salt.

3. A method according to claim 2, wherein the key-PIN and the key-Salt are generated using different seeds.

4. A method according to claim 3, wherein the key-PIN and the key-Salt are generated using a security algorithm.

5. A method according to claim 2, wherein the key-PIN and the key-Salt each comprise at least 256 bits.

6. A method according to claim 1 further comprising the step of generating the key using a security algorithm.

7. A method according to claim 1, wherein the key is unique to each recipient.

8. A method according to claim 1, wherein the key is transmitted to the recipient device with a plug-in.

9. A method according to claim 1, wherein the electronic data comprises an e-mail.

10. A method according to claim 1, wherein the electronic data comprises an e-mail attachment.

11. A method for encrypting an electronic document and a key corresponding to the electronic document such that an encrypted electronic document and an encrypted key are simultaneously transmitted to a recipient device, the method comprising the steps of:

(1) generating the encrypted electronic document by inputting an algorithm object, the key, and electronic document data into an encryption process; and (2) generating the encrypted key by inputting the algorithm object, a salt, and key data into the encryption process, thereby encrypting both the electronic document and the key corresponding to the electronic document.

12. A method according to claim 11, wherein the electronic document comprises an e-mail.

13. A method according to claim 11, wherein the electronic document comprises an e-mail attachment.

14. A method according to claim 11 further comprising the step of generating the algorithm object by inputting a password having a key identification number and a user identification number into a security algorithm.

15. A method according to claim 11 further comprising the step of generating the salt by inputting electronic document identification data and a key-Salt into a security algorithm.

16. A method for decrypting an encrypted electronic document and an encrypted key transmitted simultaneously from a sender server to a recipient device, the method comprising the steps of:

separating the encrypted electronic document and encrypted key on the recipient device;

inputting a user identification number having between 4 to 20 characters on the recipient device so that a unique password stored on the recipient device is called up, wherein the unique password includes at least 256 bits;

using the unique password so that the encrypted key becomes a decrypted key; and using the decrypted key to decrypt the encrypted electronic document.

17. A method according to claim 16, wherein the electronic document comprises an e-mail.

18. A method according to claim 16, wherein the electronic document comprises an e-mail attachment.

19. A method according to claim 16, wherein the unique password comprises a Key-PIN and a Key-Salt, and wherein using the unique password includes using the Key-PIN and the Key-Salt so that the encrypted key becomes a decrypted key.

\* \* \* \* \*